United States Patent [19]

Take et al.

[11] Patent Number: 5,296,070
[45] Date of Patent: Mar. 22, 1994

[54] PROCESS FOR PRODUCING LIQUID-CONTAINER MATERIAL

[75] Inventors: Yoshiaki Take; Hideki Yamamoto; Shigenori Morishima, all of Tokyo, Japan

[73] Assignee: Toppan Printing Co., Ltd., Tokyo, Japan

[21] Appl. No.: 888,786

[22] Filed: May 27, 1992

[30] Foreign Application Priority Data

May 31, 1991 [JP] Japan .................... 3-129681
Jul. 31, 1991 [JP] Japan .................... 3-191955

[51] Int. Cl.$^5$ ............................................ B29C 47/06
[52] U.S. Cl. ...................... 156/244.11; 156/244.23; 156/244.24; 264/211.12; 264/211.13; 264/211.18
[58] Field of Search .......... 156/244.1, 244.23, 244.24, 156/279, 283; 264/211.12, 211.13, 211.18

[56] References Cited

U.S. PATENT DOCUMENTS

| | | | |
|---|---|---|---|
| 3,380,876 | 4/1968 | Rusher | 156/244.23 |
| 4,729,926 | 3/1988 | Koteles et al. | 156/244.11 |
| 4,802,943 | 2/1989 | Gibbons | 156/244.23 |
| 4,806,398 | 2/1989 | Martin | 156/244.11 |
| 5,059,459 | 10/1991 | Huffman | 264/211.12 |

FOREIGN PATENT DOCUMENTS

| | | |
|---|---|---|
| 178812 | 9/1985 | European Pat. Off. |
| 63-281838 | 11/1963 | Japan |
| 57-144757 | 9/1982 | Japan |
| 1-96879 | 6/1989 | Japan |
| 2-43228 | 3/1990 | Japan |

*Primary Examiner*—Caleb Weston
*Attorney, Agent, or Firm*—Staas & Halsey

[57] ABSTRACT

A process for producing a liquid-container material that includes a thermoadhesive resin film, a substrate sheet having a thin-film layer of an inorganic compound, such as a silicon oxide, and a paper substrate. The thermoadhesive resin film is formed by melt-extruding a thermoadhesive resin from an extruder die, and then cooled to a temperature at which the thermoadhesive properties inherent in the thermoadhesive resin film can be retained and at which no crack is produced in the thinfilm layer of an inorganic compound when the thermoadhesive resin film is laminated to the substrate sheet. The cooled thermoadhesive resin film is laminated to the substrate sheet to form a laminate, which is then laminated to the paper substrate. The thermoadhesive resin film may preferably include a non-adsorptive resin layer and a thermoadhesive resin layer. In this instance, the non-adsorptive resin layer is so provided as to be on the outside of the liquid-container material.

10 Claims, 4 Drawing Sheets

PROCESS FOR PRODUCING LIQUID-CONTAINER MATERIAL

BACKGROUND OF THE INVENTION

1. Field of the Invention

This invention relates to a process for producing a liquid-container material. More particularly, it is concerned with a process for producing a liquid-container material mainly made of paper and having high gas barrier properties without use of a metal foil.

2. Description of the Related Art

As a liquid-container material mainly made of paper, it has been conventional to use a material comprising a laminate comprising i) a paper substrate comprised of a laminate of paper and polyethylene resin and ii) a polyethylene terephthalate film (PET film) coming in contact with contents and capable of retaining a shape when the material has been formed into a container. On the surface of the PET film coming in contact with contents, a polyethylene resin layer (a sealing layer) is further formed to impart water resistance or waterproofing properties and also impart thermoadhesive properties to the material. To such a liquid-container material, aluminum foil of about 9 μm thick is commonly also laminated as a gas barrier layer for preventing contents from undergoing oxidation and deterioration.

In recent years, it has become problematic tht the polyethylene resin in the sealing layer releases a low-molecular substance into contents or inversely adsorbs or absorbs aroma components present in the contents to damage flavor of the contents. To overcome this problem, a proposal is made on a liquid container in which a non-adsorptive resin such as a polyester resin that does not adsorb or absorb the aroma components and also does not release a low-molecular substance is used as an inner surface layer (for example, Japanese Patent Applications Laid-open No. 57-163654 and No. 1-139336).

Liquid containers of this type make use of a plastic film, and it is difficult to reuse them in an industrial scale after they have been once used. Hence, it is common for them to be put to thermal disposal after their use. There, however, is another problem of a difficulty in the thermal disposal in the case where aluminum foil is used as the gas barrier layer as in the above. For these reasons, in some areas in Europe, restrictions are placed on use of a metal foil such as aluminum foil or the like in liquid containers.

Some contents to be put in liquid containers require microwave heating. This has brought about the problem that no microwave heating can be applied when the metal foil such as aluminum foil is used.

To overcome this problem, it is also proposed not to use the metal foil as the gas barrier layer but to use as a substitute therefor a resin film having excellent gas barrier properties as exemplified by an ethylene-vinyl alcohol copolymer or polyvinylidene chloride. Such a resin film, however, has very poor gas barrier properties compared with aluminum foil and also has a high permeability. Under existing circumstances, use of such a resin film makes it difficult to achieve oxygen barrier properties and moisture barrier properties comparable to those of metal foil, and a film with a thickness feasible for practical use (30 μm or less) can give no sufficient oxygen barrier properties and moisture barrier properties.

As a different means, a technique that can achieve satisfactory gas barrier properties without use of metal foil is proposed, which is a technique in which a microwave permeable sheet mainly made of a plastic film on which a silicon oxide thin-film layer has been formed is used in place of the metal foil conventionally used in liquid-container materials having a paper substrate (Japanese Utility Model Application Laid-open No. 1-96879). This technique can accomplish sufficient oxygen barrier properties and moisture barrier properties.

For reference, comparative data of oxygen barrier properties of aluminum foil (Al-foil), an ethylene-vinyl alcohol copolymer (EVOH), polyvinylidene chloride (PVDC)-coated PET and silicon oxide (SiO) thin-film which is formed on PET are shown in Table 1 below.

TABLE 1

| | Thickness | Oxygen barrier properties (cc/m$^2$·24 hrs·atm) |
|---|---|---|
| Al foil | 9 μm | substantially 0 |
| EVOH | 12 μm | 2 to 10 cc |
| PET/PVDC | 15 μm | 7 to 15 cc |
| PET(12 μm)/SiO | 1,000 Å | <1 cc |

As is clear from the above comparative data, use of a silicon oxide thin film as a gas barrier layer of a liquid-container material can be considered to give a liquid-container material capable of eliminating the peculiar problems involved when metal foil is used. Formation of an inner surface layer using a non-absorptive resin such as a polyester resin can also be considered to give a liquid-container material that does not damage flavor of contents.

In the manufacture of such liquid-container materials, methods by which a paper substrate or a plastic sheet substrate and a plastic film are laminated are known to include the dry lamination in which a plastic film previously so formed into a film is laminated to the substrate via an adhesive, the heat lamination in which the plastic film is laminated to the substrate under application of heat to the both, and the extrusion lamination in which a thermoadhesive resin is melt-extruded into a film onto the paper substrate or plastic sheet substrate and is laminated to the substrate while being formed into the film.

Incidentally, the thin-film layer of an inorganic compound such as silicon oxide has commonly so poor a flexibility that it can not follow the expansion and contraction of the substrate sheet when the substrate sheet having the thin-film layer of an inorganic compound has undergone expansion and contraction due to heat, to cause cracks. This results in a serious lowering of the gas barrier properties inherent in the thin-film layer of an inorganic compound.

Hence, when liquid-container materials having the thin-film layer of an inorganic compound are produced, the method in which heat is applied to the substrate sheet having the thin-film layer of an inorganic compound can not be employed as the means of lamination. This necessarily follows that the dry lamination must be employed. The lamination carried out by the dry lamination, however, is cost-disadvantageous because of use of an adhesive in a large quantity. Moreover, it requires use of a film with a smooth surface as a laminating film, which is produced by blown-film extrusion, so that the blocking that lowers operability may occur when laminated sheets are wound up during the manufacture. In addition, the finished products (blank sheets for liquid containers) have smooth surfaces and hence the blocking may occur between the blank sheets. This brings about disadvantages such that automatic feeding to the operation for making up box containers can not be constantly carried out.

SUMMARY OF THE INVENTION

Accordingly, an object of the present invention is to provide a process for producing a liquid-container material, that may cause no cracks in a thin-film layer of an inorganic compound during the production of a liquid-container material having a layer structure containing the thin-film layer of an inorganic compound and also can overcome the problems involved in the dry lamination mentioned above.

Another object of the present invention is to provide a process for producing a liquid-container material that does not damage flavor of contents.

The present invention provides a process for producing a liquid-container material comprising a first thermoadhesive resin film layer, a substrate sheet having a thin-film layer of an inorganic compound, and a paper substrate, comprising the steps of;

(a) melt-extruding a thermoadhesive resin from an extruder die to form a first thermoadhesive resin film;

(b) cooling said first thermoadhesive resin film obtained in step (a), to a temperature at which the thermoadhesive properties inherent in said film can be retained and at which no crack is produced in the thin-film layer of an inorganic compound when said film is laminated to the substrate sheet having the thin-film layer of an inorganic compound;

(c) laminating said first thermoadhesive resin film obtained in step (b), to said substrate sheet having the thin-film layer of an inorganic compound to form a laminate; and (d) laminating said laminate obtained in step (c), to said paper substrate.

The present invention also provides a process for producing a liquid-container material comprising a first thermoadhesive resin film layer having a non-adsorptive resin layer, a substrate sheet having a thin-film layer of an inorganic compound, and a paper substrate, comprising the steps of:

(a) melt-extruding a thermoadhesive resin from an extruder die to form a first thermoadhesive resin film;

(b) cooling said first thermoadhesive resin film obtained in step (a), to a temperature at which the thermoadhesive properties inherent in said film can be retained and at which no crack is produced in the thin-film layer of an inorganic compound when said film is laminated to the substrate sheet having the thin-film layer of an inorganic compound;

(c) laminating said first thermoadhesive resin film obtained in step (b), to said substrate sheet having the thin-film layer of an inorganic compound to form a laminate in such a way that said non-adsorptive resin layer is on the outside; and (d) laminating said laminate obtained in step (c), to said paper substrate in such a way that said non-adsorptive resin layer is on the outside.

DESCRIPTION OF THE PREFERRED EMBODIMENTS

The present invention will be described below in detail with reference to the accompanying drawings.

Figure 1:
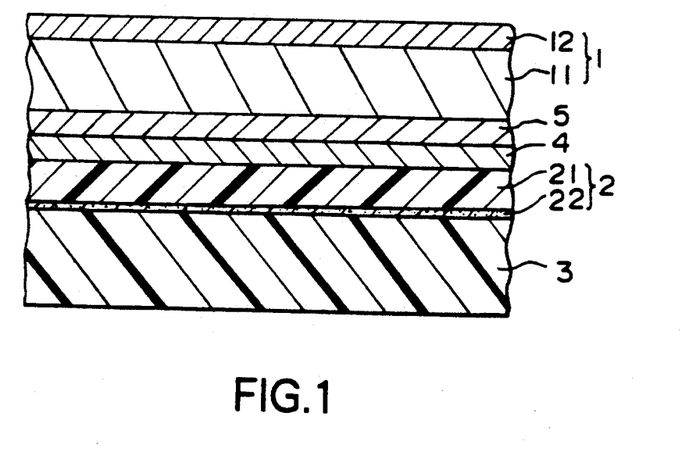
FIG. 1 is a cross-sectional illustration of the liquid-container material obtained by the process of the present invention.

A preferred example of the liquid-container material obtained by the production process of the present invention is basically comprised of, as shown in FIG. 1, a paper substrate 1, a substrate sheet having a thin-film layer 22 of an inorganic compound, and a first thermoadhesive resin film 3. It may optionally be further comprised of a second thermoadhesive resin film 4 provided between the paper substrate 1 and the substrate sheet 2, and also a thermoadhesive resin layer 5 interposed between the second thermoadhesive resin film 4 and the paper substrate 1. As the paper substrate 1, any paper substrates conventionally used for liquid-container materials of this type can be used. For example, it is possible to use a substrate comprising a paper base 11 made of bleached kraft paper with a basis weight of from about 200 to 500 g/m$^2$ and, laminated to its surface, a sealing layer 12 with a thickness of from about 17 to 25 μm made of a polyolefin resin such as polyethylene, which imparts sealing properties necessary for giving the shape of a container. The sealing layer 12 can be laminated to the paper base 11 by any conventional methods.

The substrate sheet 2 is comprised of a base film 21 made of, for example, polyethylene terephthalate, stretched nylon, stretched ethylene-vinyl alcohol copolymer, and a thin-film layer 22 of an inorganic compound having excellent gas barrier properties as exemplified by silicon oxide or magnesium oxide, formed on the base film by vacuum deposition, plasma deposition, sputtering, ion plating or the like process. In particular, a thin film formed by vacuum deposition of silicon oxide is preferred in view of readiness in the manufacture and cost.

The base film 21 may preferably be formed in a thickness of about 6 to 20 μm taking account of the step of forming the thin-film layer 22 of an inorganic compound and the handling qualities in the processing steps after that step.

The thin-film layer 22 of an inorganic compound should be formed in a thickness, though variable depending on the type of inorganic compound used, of at least 200 Å and 2,000 Å or less when silicon oxide is used as the inorganic compound. This is because a thin-film layer with a thickness smaller than 200 Å gives a possibility of making it impossible to achieve sufficient gas barrier properties and a thin-film layer with a thickness larger than 2,000 Å may seriously cause cracks in the thin-film layer in a subsequent step, and can not be of practical use.

The first thermoadhesive resin film 3 can be formed using a thermoadhesive resin such as a low-density polyethylene.

In the present invention that produces the liquid-container material thus structured, the thermoadhesive resin is extruded from an extruder die to form the first thermoadhesive resin film 3, which is then cooled to an appropriate temperature. The cooled film is laminated to the substrate sheet 2 having the thin-film layer 22 of an inorganic compound, utilizing the thermoadhesive properties of the resin, to give an integral form. Since in this way the substrate sheet 2 having the thin-film layer 22 of an inorganic compound and the first thermoadhesive resin film 3 cooled within the limit of a temperature range in which the thermoadhesive properties can be exhibited are laminated to each other, the influence of heat on the thin-film layer of an inorganic compound can be decreased and hence cracks can be prevented from being produced in the thin-film layer 22.

Figure 3:
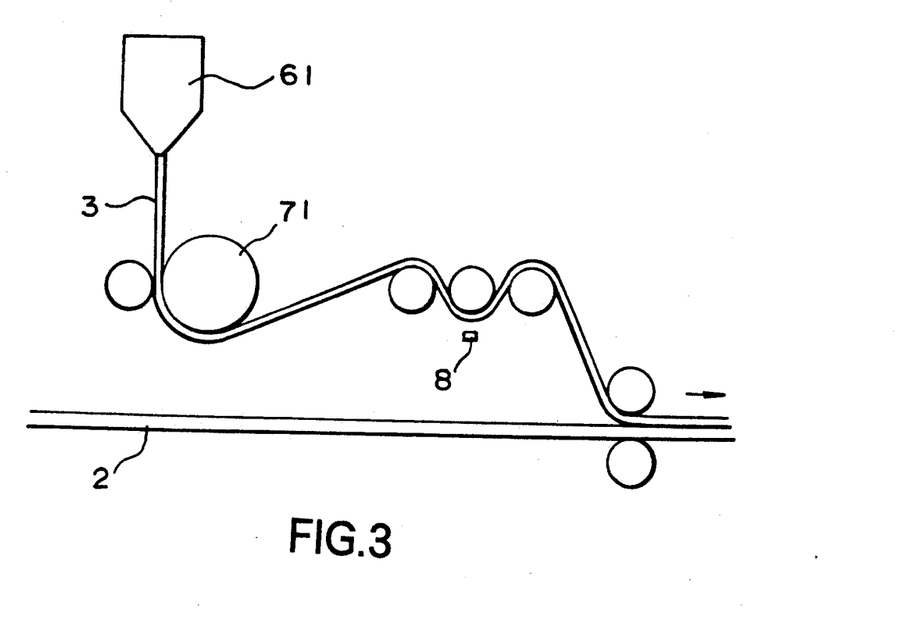
FIG. 3 illustrates the step of laminating the first thermoadhesive resin film in the production process of the present invention.

More specifically, as shown in FIG. 3, the thermoadhesive resin is extruded from an extruder die 61 to form the first thermoadhesive resin film 3, which is then cooled using a cooling means such as a chill roll 71 to a temperature at which the thermoadhesive properties inherent in the film can be retained and a temperature at which no crack is produced in the thin-film layer of an inorganic compound when the film is laminated to the substrate sheet 2 having the thin-film layer of an inorganic compound. Subsequently, the cooled film is superposed onto the substrate sheet 2, followed by pressure bonding to effect lamination. Here, the surface of the first thermoadhesive resin film 3 may optionally be subjected to, for example, corona discharge treatment so that its adhesion to the substrate sheet 2 can be improved. The corona discharge treatment can be made using a known corona discharger 8 according to the same treatment as that conventionally made. The laminating surface of the substrate sheet 2 to which the first thermoadhesive resin film 3 is laminated may further optionally be provided with an adhesion anchor coat layer (not shown).

With regard to the temperature range in which the first thermoadhesive resin film 3 is cooled, its upper limit may vary depending on the material and thickness of the base film 21, the type of the inorganic compound and the thickness of the thin-film layer 22. The cooling should be to a temperature in the range of from 15° to 90° C., and preferably from 20° to 50° C. Cooling to a temperature higher than 90° C. gives a higher possibility of causing cracks in the thin-film layer 22 of an inorganic compound. Cooling to a temperature lower than 15° C., on the other hand, may give an insufficient bond strength between the first thermoadhesive resin film 3 and the substrate sheet 2, resulting in an easy separation of them from each other to make it impossible to use the product as a packaging material.

The first thermoadhesive resin film 3 may be laminated on either side of the substrate sheet 2, i.e., either on the side of its thin-film layer 22 or on the side of the base film 21.

The laminate thus obtained, comprised of the first thermoadhesive resin film 3 and the substrate sheet 2, can be laminated to the paper substrate 1 by a method requiring no heating as in the dry lamination. As previously stated, however, there is a problem of cost and so forth where the laminate comprised of the substrate sheet 2 and the first thermoadhesive resin film 3 is laminated to the substrate sheet 2 by the dry lamination. Hence, the second thermoadhesive resin film 4 may preferably be directly laminated to the substrate sheet 2 after it has been cooled to a given temperature as in the case of the first thermoadhesive resin film 3.

Where in this way the second thermoadhesive resin film 4 cooled within the limit of a temperature range in which the thermoadhesive properties can be exhibited is laminated to the opposite side of the substrate sheet 2 to which the first thermoadhesive resin film 3 has been laminated, the influence of heat on the thin-film layer of an inorganic compound can be decreased and hence cracks can be prevented from being produced in the thin-film layer 22. This second thermoadhesive resin film 4 also serves as a heat insulating layer upon further cooling after lamination, so that it becomes possible in the lamination to the paper substrate 1 to utilize the lamination method that requires heating.

Figure 4:
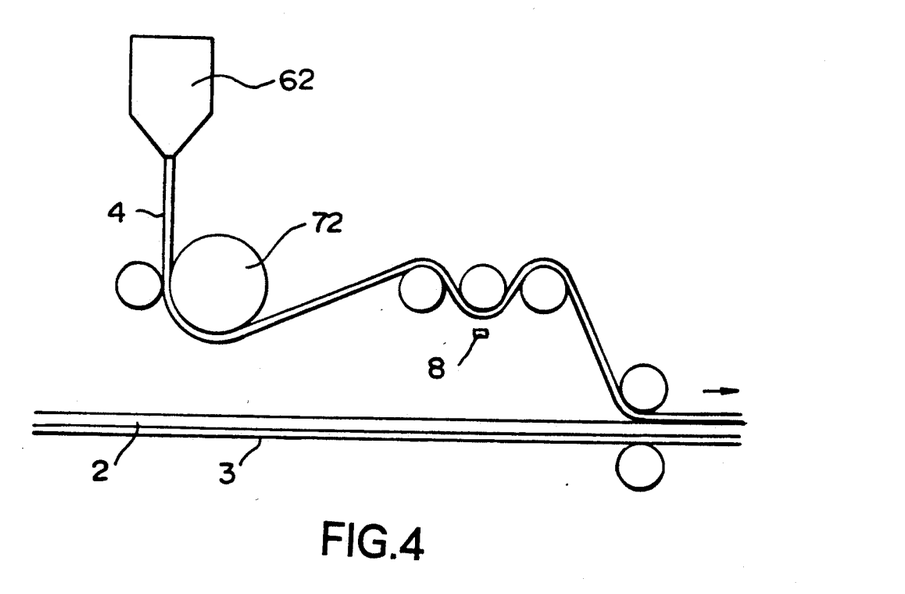
FIG. 4 illustrates the step of laminating a second thermoadhesive resin film in the production process of the present invention.

The second thermoadhesive resin film 4 can be laminated in the same manner as in the lamination of the first thermoadhesive resin film 3. More specifically, as shown in FIG. 4, the thermoadhesive resin is extruded from an extruder die 62 into a film, which is then cooled using a cooling means such as a chill roll 71 to a temperature at which the thermoadhesive properties inherent in the film can be retained and a temperature at which no crack is produced in the thin-film layer 22 of an inorganic compound when the film is laminated to the substrate sheet 2 having the thin-film layer of an inorganic compound. Subsequently, the cooled film is superposed onto the substrate sheet 2 on its side opposite to the side to which the first thermoadhesive resin film 3 has been laminated, followed by pressure bonding to effect lamination. The corona discharge treatment and formation of an adhesion anchor coat layer may also be optionally made in the same way as in the case of the first thermoadhesive resin film 3.

The same resin as used for the first thermoadhesive resin film 3, previously described, for example, a low-density polyethylene, can be used as a resin for the second thermoadhesive resin film 4.

In the laminate in which the second thermoadhesive resin film 4 has been laminated to the substrate sheet 2 as described above, this first thermoadhesive resin film 3 serves as a heat insulating layer, so that an extreme heat is no longer transmitted to the substrate sheet 2. Hence, such a laminate can be bonded to the paper substrate 1 by using a known lamination means that utilizes heat.

In order for this second thermoadhesive resin film 4 to well function as the heat insulating layer, the second thermoadhesive resin film 4 may preferably be formed in a thickness of 15 $\mu$m or more.

There are no limitations on the order of lamination of the first thermoadhesive resin film 3 and the second thermoadhesive resin film 4, any of which may be laminated first.

Figure 5:
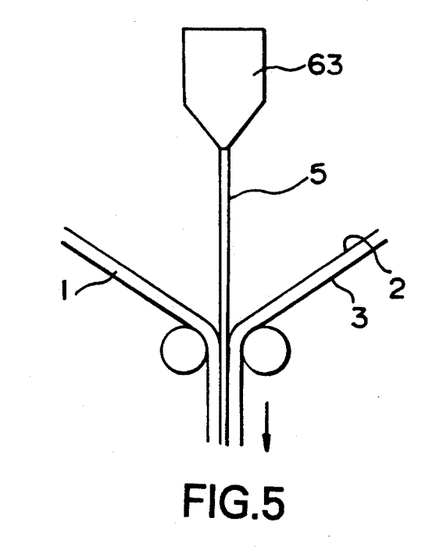
FIG. 5 illustrates the step of laminating a substrate sheet and a paper substrate via a thermoadhesive resin.

The laminate comprised of the first thermoadhesive resin film 3, the substrate sheet 2 and the second thermoadhesive resin film 4 can be laminated to the paper substrate 1 by the dry lamination, or alternatively can be laminated by the method that utilizes heat. For example, as shown in FIG. 5, a resin for a third thermoadhesive resin film 5 may be melt-extruded between this laminate and the paper substrate 1, followed by pressure bonding of the both to effect lamination. Lamination carried out in this way makes it possible to produce a liquid-container material without the problem caused when the dry lamination is carried out.

There are no particular limitations on the third thermoadhesive resin film 5 so long as it is adhesive to both the second thermoadhesive resin film 4 and the paper substrate 1. It is preferred to use the same resin as used for the second thermoadhesive resin film 4 since their adhesion can be improved. This third thermoadhesive resin film 5 is satisfactory if it is in a thickness of 10 μm.

What is called the heat lamination can also be applied to the present invention, which is a method in which another thermoadhesive resin layer of polyethylene or the like is previously provided on the substrate sheet 2 on its side coming in contact with the second thermoadhesive resin film 4 and this thermoadhesive resin layer and the second thermoadhesive resin film 4 are heated to effect lamination. In this instance, in order to prevent cracks from being produced in the thin-film layer 22, it is preferred not to supply a large amount of heat form the substrate sheet 2 side but to supply heat from the paper base 11 side.

In the above description of the present invention, what has been detailed is an embodiment in which the first thermoadhesive resin film 3 is formed of a single layer.

Figure 2:
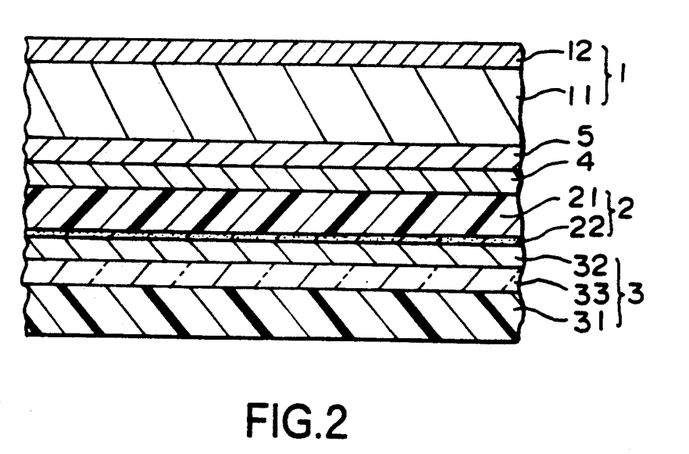
FIG. 2 is a cross-sectional illustration of another embodiment of the liquid-container material obtained by the process of the present invention.

In order to prevent the flavor of contents from being damaged, the first thermoadhesive resin film 3 may preferably be comprised of, as shown in FIG. 2, a non-adsorptive resin layer 31 and a thermoadhesive resin layer 32.

A resin that substantially little adsorbs or absorbs aroma components present in the contents and does not release into the contents a substance that may damage flavor is used as a resin for the non-adsorptive resin layer 31. For example, it is possible to use polyethylene terephthalate, polybutylene terephthalate, or acid-modified and/or glycol-modified polyester resins obtained by appropriately changing the acid component or glycol component that constitutes these polyester resins, and polyester resins such as copolyesters optionally incorporated with any other third component. Besides, an ethylene-vinyl alcohol copolymer, polyacrylonitrile, copolymer or blend resins of these, or blend resins of these and other resins can also be used so long as there is no problem in practical use.

The non-adsorptive resin layer 31 is always formed on the side coming in contact with the contents of the liquid container. For this reason, the resin for the non-adsorptive resin layer 31 may preferably have heat-sealing properties in view of the manufacture of the liquid container from the liquid-container material. For example, in the case where a polyester resin is used for the non-adsorptive resin layer 31, the heat sealing properties can be obtained using the resin acid-modified and/or glycol-modified as mentioned above.

The resin for the non-adsorptive resin layer 31 usually has no sufficient extrudability and hence in some cases can be formed into a film with difficulty when extruded alone. In such cases, the resin should preferably be formed into a film by co-extruding it together with other resin excellent in extrudability. In the present invention, it is recommendable to use the thermoadhesive resin layer 32 as a carrier or support and carry out co-extrusion with a resin therefor.

Here, as the resin for the thermoadhesive resin layer 32, it is preferred to use a resin having a smaller melt flow ratio (MFR) than that for the non-adsorptive resin layer 31, as exemplified by a low-density polyethylene.

That is, use of the resin having a smaller MFR makes it possible to minimize the neck-in of the non-adsorptive resin layer 31 at the time of co-extrusion of the resins for the non-adsorptive resin layer 31 and thermoadhesive resin layer 32. This enables ready and cost-saved formation of a flexible and uniform thermoadhesive resin film 3.

In the case when the thermoadhesive resin film 3 is formed by the co-extrusion of the resins for the non-adsorptive resin layer 31 and thermoadhesive resin layer 32, an adhesive resin 33 may be optionally interposed between them.

As the adhesive resin 33, a resin adhesive to both the non-adsorptive resin layer 31 and the thermoadhesive resin layer 32 is used. For example, in the case when a polyester resin is used as the resin for the non-adsorptive resin layer 31 and a low-density polyethylene as the resin for the thermoadhesive resin layer 32, a modified polyolefin resin may be used as the adhesive resin 33.

In the case where the thermoadhesive resin film 3 is formed of the non-adsorptive resin layer 31 and the thermoadhesive resin layer 32 optionally interposing the adhesive resin 33 between them, it can be formed by co-extruding the resins for these layers from an extruder die. The thermoadhesive resin film 3 thus formed is cooled to a temperature at which the thermoadhesive properties inherent in the film can be retained and a temperature at which no crack is produced in the thin-film layer 22 of an inorganic compound when the film is laminated to the substrate sheet 2 having the thin-film layer of an inorganic compound, and then laminated to the substrate sheet 2 to form a laminate in such a way that the non-adsorptive resin layer 31 is on the outside. This laminate is further laminated to the paper substrate 1 to give an integral form. The liquid-container material can be thus obtained.

In the liquid-container material shown in FIG. 2, the second thermoadhesive resin film 4 and the third thermoadhesive resin film 5 may be of the same constitution as that described in relation to FIG. 1, and the same effect can be obtained.

An aluminum-deposited layer may be further provided on the substrate sheet 2 having the thin-film layer 22 of an inorganic compound. For example, a base film on one side of which the thin-film layer of an inorganic compound is formed and the other side of which the aluminum-deposited layer is formed may be used as the substrate sheet. Alternatively, a base film on one side of which the thin-film layer of an inorganic compound has been formed and another base film on one side of which the aluminum-deposited layer has been formed may be laminated by the dry lamination and the resulting laminate may be used as the substrate sheet 2. In this instance, the thin-film layer of an inorganic compound and the aluminum-deposited layer may preferably be put together face-to-face.

Forming the aluminum-deposited layer on the substrate sheet in this way makes it possible to achieve a sufficient oxygen permeability and moisture permeability even when the thickness of the thin-film layer of an inorganic compound is made as small as from 200 to 800 Å. In this case, the aluminum-deposited layer can be satisfactory in a thickness of from 400 to 800 Å. When the liquid-container material of the present invention having the aluminum-deposited layer with such a thickness is burnt, its cinders do not form a mass, different from conventional liquid-container materials having aluminum foil.

Figure 6:
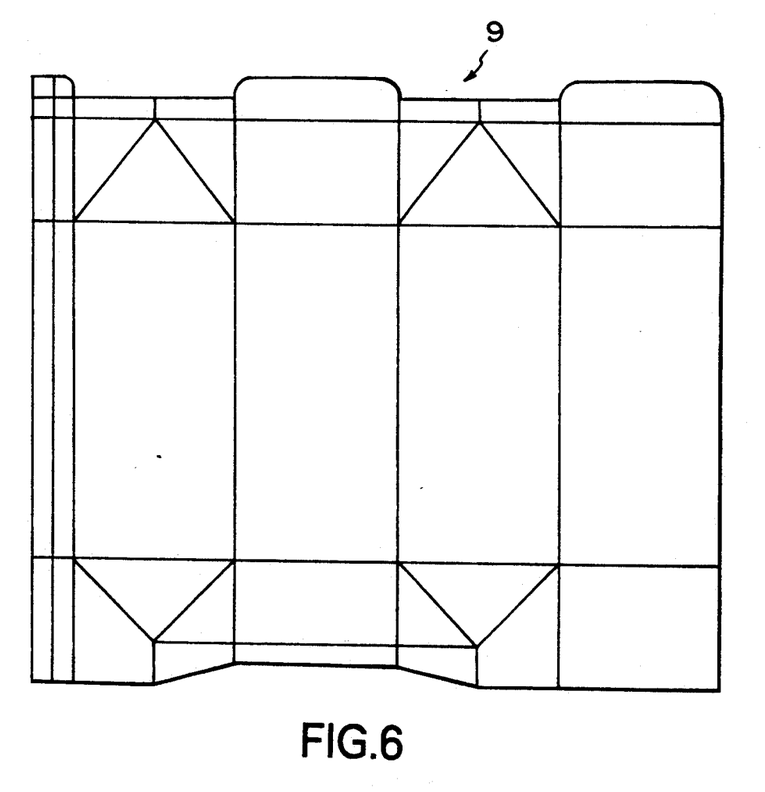
FIG. 6 is a plan view of an example of the blank sheet formed of the liquid-container material obtained by the production process of the present invention and from which a liquid container is made up.
Figure 7:
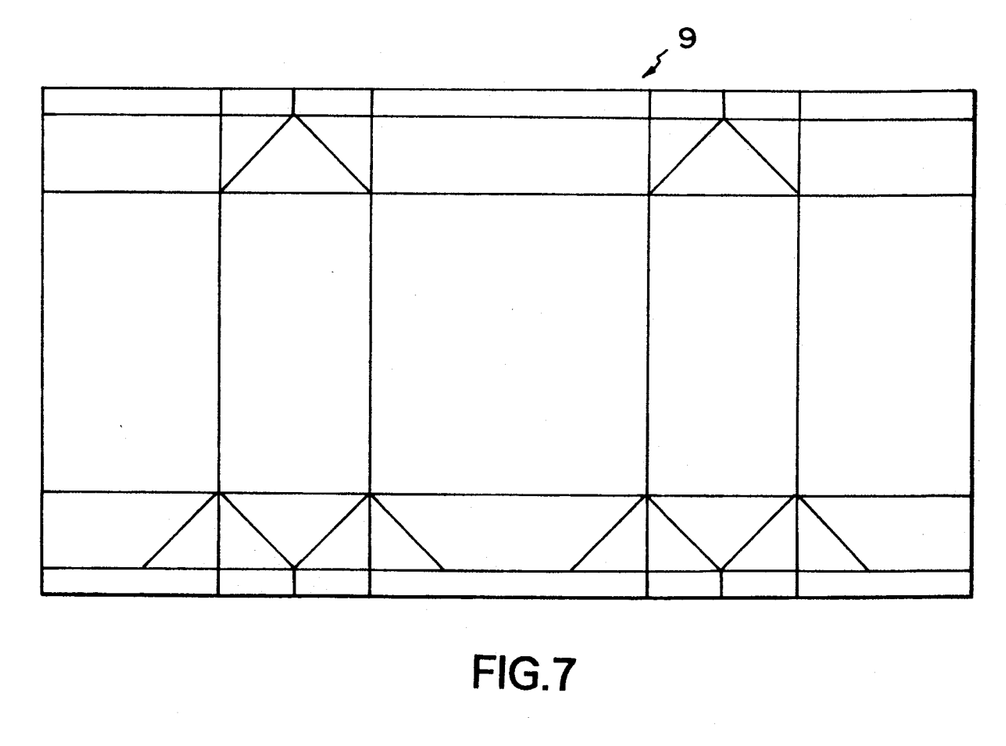
FIG. 7 is a plan view of another example of the blank sheet formed of the liquid-container material obtained by the production process of the present invention and from which a liquid container is made up.

The liquid-container material of the present invention, obtained in the manner described above, is punched into a blank 9 in the shape, for example, as shown in FIG. 6 or 7. The blank is then folded along the fine solid lines shown in the drawing and so heat-sealed at its peripheral edges as to be formed into a square container having a roof-shaped top or a block-shaped container. It is also possible to form the liquid-container material obtained according to the present invention, into a cylinder and suitable cover members are fitted to top and bottom openings to give a cylindrical container with ease.

In the present invention, since the laminating thermoadhesive resin films are formed by extrusion, the smoothness of their surfaces depends on the state of the surfaces of nip rolls used in the extrusion, and the surfaces can be matted so as to have an appropriate slipperiness.

In the container formed from the liquid-container material obtained according to the present invention, various kinds of drinks can be packed as conventionally done. In particular, the container is suited to be packed with juice, sake (Japanese rice wine), Western liquors, tea, coffee and other soft drinks, or bath agents, which are contents whose aromas must be retained.

EXAMPLES

The present invention will be described below in greater detail by giving Examples.

EXAMPLE 1

A 20 $\mu$m thick polyethylene film was laminated to one side of bleached kraft paper with a basis weight of 320 g/m$^2$ (available from Shin Fuji Seishi K.K.; trade name: SIE). Thus a paper substrate was prepared.

Separately therefrom, on one side of a 12 $\mu$m thick biaxially stretched polyethylene terephthalate film (available from Teijin Limited; trade name: NS), a 1,500 Å thick silicon oxide layer as the thin-film layer of an inorganic compound was provided by vacuum deposition. Thus a substrate sheet was prepared.

Next, polyethylene resin (available from Mitsui Petrochemical Industries, Ltd; trade name: M401PC) was extruded from an extruder die into a 30 $\mu$m thick film. This film was cooled on a chill roll having been cooled to about 5° C., and the cooled film was subjected to corona discharge treatment (degree of treatment: surface wetting tension 43 dyne/cm or more; according to JIS K6768). Thereafter, the film thus treated was superposed to the silicon oxide layer side of the substrate sheet, followed by pressure bonding to effect lamination. At this time the extruded polyethylene resin had a temperature of about 35° C. immediately before the lamination.

Next, polyethylene resin (available from Mitsui Petrochemical Industries, Ltd; trade name: M401PC) was extruded from an extruder die into a 30 $\mu$m thick film. This film was cooled on a chill roll having been cooled to about 5° C., and the cooled film was subjected to corona discharge treatment (degree of treatment: surface wetting tension 43 dyne/cm or more; according to JIS K6768). Thereafter, the film thus treated was superposed to the polyethylene terephthalate side of the substrate sheet, followed by pressure bonding to effect lamination. A laminate was thus produced, having a layer structure of first thermoadhesive resin film/polyethylene terephthalate film/silicon oxide thin-film layer/second thermoadhesive resin film.

Subsequently, the second thermoadhesive resin film of the above laminate and the paper of the paper substrate was brought face to face with each other, and polyethylene resin was extruded between them from an extruder die in a thickness of 20 $\mu$m, followed by pressure bonding and cooling of the both to effect lamination. A liquid-container material of the present invention was thus obtained.

Oxygen permeability and moisture permeability of this liquid-container material were measured to reveal that it had an oxygen permeability of 1 to 3 cc/m$^2$.24 hr.atm and a moisture permeability of 0.5 to 3 g/m$^2$.24 hr.atm, having satisfactory gas barrier properties.

This liquid-container material was burnt. As a result, its cinders did not form a mass since no aluminum foil was used.

COMPARATIVE EXAMPLE 1

Example 1 was repeated to produce a liquid-container material, except that the extruded polyethylene was not cooled when the first polyethylene layer and second polyethylene layer were formed. The gas barrier properties of this liquid-container material was evaluated to reveal that it had an oxygen permeability of 10 cc/m$^2$.24 hr.atm and a moisture permeability of 10 g/m$^2$.24 hr.atm, having no satisfactory gas barrier properties.

This material was took apart, and the state of the silicon oxide layer was observed using a microscope to find that numberless fine cracks were produced.

EXAMPLE 2

A 20 $\mu$m thick polyethylene film was laminated to one side of bleached kraft paper with a basis weight of 320 g/m$^2$ (available from Shin Fuji Seishi K. K.; trade name: SIE). Thus a paper substrate was prepared.

Separately therefrom, on one side of a 12 $\mu$m thick biaxially stretched polyethylene terephthalate film (available from Teijin Limited; trade name: NS), a 1,500 Å thick silicon oxide layer as the thin-film layer of an inorganic compound was provided by vacuum deposition. Thus a substrate sheet was prepared.

Next, to the silicon oxide side of the substrate sheet, polyethylene resin (available from Mitsui Petrochemical Industries, Ltd; trade name: M401PC) was extruded from an extruder die into a 30 $\mu$m thick film. This film was cooled on a chill roll having been cooled to about 5° C., and the cooled film was subjected to corona discharge treatment (degree of treatment: surface wetting tension 43 dyne/cm or more; according to JIS K6768). Thereafter, the film thus treated was superposed to the substrate sheet, followed by pressure bonding to effect lamination. At this time the extruded polyethylene resin had a temperature of about 35° C. immediately before the lamination.

Next, polyester resin (available from Mitsui Polychemical Du Pont, Ltd; trade name: SEALER PT J-802), adhesive resin (available from Mitsui Petrochemical Industries, Ltd; trade name: ADMER SE800) and polyethylene resin (available from Mitsui Petrochemical Industries, Ltd; trade name: M401PC) were extruded from co-extruder die. The resulting extruded filmy resin (resin temperature; about 280° C.) was cooled on a chill roll having been cooled to about 5° C., and the cooled film was subjected to corona discharge treatment (degree of treatment: surface wetting tension 43 dyne/cm or more; according to JIS K6768). Thereafter, the film thus treated was superposed to the polyethylene terephthalate side of the substrate sheet, followed by pressure bonding to effect lamination. A laminate was thus produced, having a layer structure of polyester resin layer/adhesive resin layer/polyethylene layer/polyethylene terephthalate film/silicon oxide thin-film layer/polyethylene layer.

Subsequently, the polyethylene layer of this laminate and the paper of the paper substrate was brought face to face with each other, and polyethylene resin was extruded between them from an extruder die in a thickness of 20 μm, followed by pressure bonding and cooling of the both to effect lamination. A liquid-container material of the present invention was thus obtained.

Oxygen permeability and moisture permeability of the liquid-container material thus obtained were measured to reveal that it had an oxygen permeability of 1 cc/$m^2$.24hr.atm and a moisture permeability of 0.7 g/$m^2$24hr.atm, having satisfactory gas barrier properties.

This liquid-container material was burnt. As a result, its cinders did not form a mass since no aluminum foil was used.

The present liquid-container material was punched into blanks as shown in FIG. 5, which were folded into liquid containers. Orange juice was packed therein as contents, which were preserved for 4 weeks under conditions of 25° C. and 65%RH and thereafter the orange juice was organoleptically examined. As a result, its flavor did not change at all.

COMPARATIVE EXAMPLE 2

Example 2 was repeated to produce a liquid-container material, except that the co-extruded resins were not cooled. The gas barrier properties of this liquid-container material was evaluated to reveal that it had an oxygen permeability of 5 cc/$m^2$24hr.atm and a moisture permeability of 3 g/$m^2$.24hr.atm, having no satisfactory gas barrier properties.

This liquid-container material was took apart, and the state of the silicon oxide layer was observed using a microscope to find that numberless fine cracks were produced.

EXAMPLE 3

A 20 μm thick polyethylene film was laminated to one side of bleached kraft paper with a basis weight of 320 g/$m^2$ (available from Shin Fuji Seishi K.K. trade name: SIE). Thus a paper substrate was prepared.

Separately therefrom, on one side of a 12 μm thick biaxially stretched polyethylene terephthalate film (available from Teijin Limited; trade name: NS), a 800 Å thick silicon oxide layer as the thin-film layer of an inorganic compound was provided by vacuum deposition to form a film, and also, on one side of a 12 μm thick biaxially stretched polyethylene terephthalate film (available from Teijin Limited; trade name: NS), a 600 Å thick aluminum layer was provided by vacuum deposition to form another film. These films were laminated to each other by the dry lamination with their deposit sides face to face. Thus a substrate sheet was prepared.

Next, polyethylene resin (available from Mitsui Petrochemical Industries, Ltd; trade name: M401PC) was extruded from an extruder die into a 20 μm thick film. This film was superposed to the substrate sheet from the side on which the aluminum layer was provided, followed by pressure bonding to effect lamination. At this time the extruded polyethylene resin had a temperature of about 35° C. immediately after the lamination.

Next, polyethylene resin (available from Mitsui Petrochemical Industries, Ltd; trade name: M401PC) was extruded from an extruder die into a 20 μm thick film. This film was cooled on a chill roll having been cooled to about 5° C., and the cooled film was subjected to corona discharge treatment (degree of treatment: surface wetting tension 43 dyne/cm or more; according to JIS K6768). Thereafter, the film thus treated was superposed to the polyethylene terephthalate side of the substrate sheet, followed by pressure bonding to effect lamination. A laminate was thus produced, having a layer structure of polyethylene layer/polyethylene terephthalate film/silicon oxide thin-film layer/aluminum-deposited layer/polyethylene terephthalate film/polyethylene layer.

Subsequently, the polyethylene layer of this laminate and the paper of the paper substrate was brought face to face with each other, and polyethylene resin was extruded between them from an extruder die in a thickness of 20 μm, followed by pressure bonding and cooling of the both to effect lamination. A liquid-container material of the present invention was thus obtained.

Oxygen permeability and moisture permeability of the liquid-container material thus obtained were measured to reveal that it had an oxygen permeability of 1.5 cc/$m^2$.24 hr.atm and a moisture permeability of 0.5 g/$m^2$.24 hr.atm, having satisfactory gas barrier properties.

This liquid-container material was burnt. As a result, its cinders did not form a mass since no aluminum foil was used.

What is claimed is:

1. A process for producing a liquid-container material comprising a first thermoadhesive resin film layer, a substrate sheet having a thin-film layer of an inorganic compound, and a paper substrate, comprising the steps of:
    (a) melt-extruding a thermoadhesive resin from an extruder die to form a first thermoadhesive resin film;
    (b) cooling said first thermoadhesive resin film obtained in step (a), to a temperature at which the thermoadhesive properties inherent in said film can be retained and at which no crack is produced in the thin-film layer of an inorganic compound when said film is laminated to the substrate sheet having the thin-film layer of an inorganic compound;
    (c) laminating said first thermoadhesive resin film obtained in step (b), to said substrate sheet having the thin-film layer of an inorganic compound to form a laminate, wherein the thin-film layer of an inorganic compound is formed by a dry plating process; and
    (d) laminating said laminate obtained in step (c), to said paper substrate.

2. The process according to claim 1, wherein said step (c) comprises the steps of:
    (c1) laminating said first thermoadhesive resin film obtained in step (b), to said substrate sheet having the thin-film layer of an inorganic compound; and
    (c2) repeating steps (a) and (b), to form a second thermoadhesive resin film, and then laminating the second thermoadhesive resin film to a side of said substrate sheet on which the first thermoadhesive resin film is not laminated.

3. The process according to claim 2, wherein in said step (d) said laminate is laminated to said paper substrate while a molten thermoadhesive resin is extruded between the both.

4. A process for producing a liquid-container material comprising a first theroadhesive resin film layer having a non-adsorptive resin layer, a substrate sheet having a thin-film layer of an inorganic compound, and a paper substrate, comprising the steps of:
   (a) melt-extruding a thermoadhesive resin from an extruder die to form a first thermoadhesive resin film;
   (b) cooling said first thermoadhesive resin film obtained in step (a), to a temperature at which the thermoadhesive properties inherent in said film can be retained and at which no crack is produced in the thin-film layer of an inorganic compound when said film is laminated to the substrate sheet having the thin-film layer of an inorganic compound;
   (c) laminating said first thermoadhesive resin film obtained in step (b), to said substrate sheet having the thin-film layer of an inorganic compound to form a laminate in such a way that said non-adsorptive resin layer is on the outside, wherein the thin-film layer of an inorganic compound is formed by a dry plating process; and
   (d) laminating said laminate obtained in step (c), to said paper substrate in such a way that said non-adsorptive resin layer is on the outside.

5. The process according to claim 4, wherein said step (c) comprises the steps of;
   (c1) laminating said first thermoadhesive resin film obtained in step (b), to said substrate sheet having the thin-film layer of an inorganic compound in such a way that said non-adsorptive resin layer is on the outside;
   (c2) melt-extruding a thermoadhesive resin from an extruder die to form a second thermoadhesive resin film;
   (c3) cooling said second thermoadhesive resin film obtained in step (c2), to a temperature at which the thermoadhesive properties inherent in said film can be retained and a temperature at which no crack is produced in the thin-film layer of an inorganic compound when said film is laminated to the substrate sheet having the thin-film layer of an inorganic compound; and
   (c4) laminating said second thermoadhesive resin film obtained in step(3c), to said substrate sheet on its side to which the first thermoadhesive resin film is not laminated.

6. The process according to claim 5, wherein in said step (d) said laminate is laminated to said paper substrate while a molten thermoadhesive resin is extruded between the both.

7. The process according to claim 1, wherein the thin-film layer of an inorganic compound is a silicon oxide formed by vacuum deposition.

8. The process according to claim 7, wherein the silicon oxide thin-film layer has a thickness of 200–2000 Å.

9. The process according to claim 4, wherein the thin-film layer of an inorganic compound is a silicon oxide formed by vacuum deposition.

10. The process according to claim 9, wherein the silicon oxide thin-film layer has a thickness of 200–2000 Å.

* * * * *

UNITED STATES PATENT AND TRADEMARK OFFICE
CERTIFICATE OF CORRECTION

PATENT NO. : 5,296,070
DATED : March 22, 1994
INVENTOR(S) : Yoshiaki Take et al.

It is certified that error appears in the above-indentified patent and that said Letters Patent is hereby corrected as shown below:

Col. 1, line 29, delete "tht" and insert --that--.
Col. 5, line 50, delete the "." after "90°C";
    line 51, delete the "." after "90°C"; and
    line 54, delete the "." after "15°C".
Col. 9, line 46, delete the "." after "5°C";
    line 53, delete the "." after "35°C"; and
    line 59, delete the "." after "5°C".
Col. 10, line 48, delete the "." after "5°C";
    line 54, delete the "." after "35°C";
    line 63, delete the "." after "280°C"; and
    line 64, delete the "." after "5°C".
Col. 11, line 27, delete the "." after "25°C"; and
    line 68, delete the "." after "35°C".
Col. 12, line 5, delete the "." after "5°C".

Signed and Sealed this

Thirtieth Day of August, 1994

Attest:

BRUCE LEHMAN

*Attesting Officer*    *Commissioner of Patents and Trademarks*